US012576859B1

(12) United States Patent
Hartmann et al.

(10) Patent No.: US 12,576,859 B1
(45) Date of Patent: Mar. 17, 2026

(54) OBJECT CLASSIFICATION WITH OUT-OF-DISTRIBUTION DETECTION

(71) Applicant: Zoox, Inc., Foster City, CA (US)

(72) Inventors: Till Sebastian Hartmann, Brookline, MA (US); Daniel Lu Jiang, Morgan Hill, CA (US); Nicholas George Dilip Roy, Needham, MA (US)

(73) Assignee: Zoox, Inc., Foster City, CA (US)

( * ) Notice: Subject to any disclaimer, the term of this patent is extended or adjusted under 35 U.S.C. 154(b) by 98 days.

(21) Appl. No.: 18/744,275

(22) Filed: Jun. 14, 2024

(51) Int. Cl.
*B60W 50/00* (2006.01)
*B60W 60/00* (2020.01)
*G06F 18/2415* (2023.01)

(52) U.S. Cl.
CPC ...... *B60W 50/0097* (2013.01); *B60W 60/001* (2020.02); *G06F 18/2415* (2023.01); *B60W 2554/00* (2020.02)

(58) Field of Classification Search
CPC ........... B60W 50/0097; B60W 60/001; B60W 2554/00; G06F 18/2415
See application file for complete search history.

(56) References Cited

U.S. PATENT DOCUMENTS

| | | | |
|---|---|---|---|
| 2022/0261617 A1* | 8/2022 | Brahma | G06N 3/084 |
| 2022/0284261 A1* | 9/2022 | Lillo | G06N 3/04 |
| 2023/0051565 A1* | 2/2023 | Cower | G06V 20/56 |

* cited by examiner

*Primary Examiner* — Vivek D Koppikar
*Assistant Examiner* — Jeffrey R Chalhoub
(74) *Attorney, Agent, or Firm* — Lee & Hayes, P.C.

(57) ABSTRACT

An out-of-distribution (OOD) detector may be provided to efficiently identify OOD inputs to trained machine learning models, to prevent passing misleading predictions from the trained models to downstream systems. During training of a machine learning model including a deep neural network (e.g., an object detection and/or object classifier model based on sensor data), an out-of-distribution detector may be constructed by modeling the density of the intermediate features of the deep neural network (e.g., using a Gaussian mixture model). In some examples, the intermediate features may be within a finetuned model based on a pretrained foundation model, and the machine learning model may be finetuned with regularization toward the original weights of the pretrained model. During inference, the machine learning model may output predictions, such as multilabel object detection and/or classification outputs, and the out-of-distribution detector may be used to efficiently generate confidence values associated with the outputs of the model.

18 Claims, 5 Drawing Sheets

Figure 4:
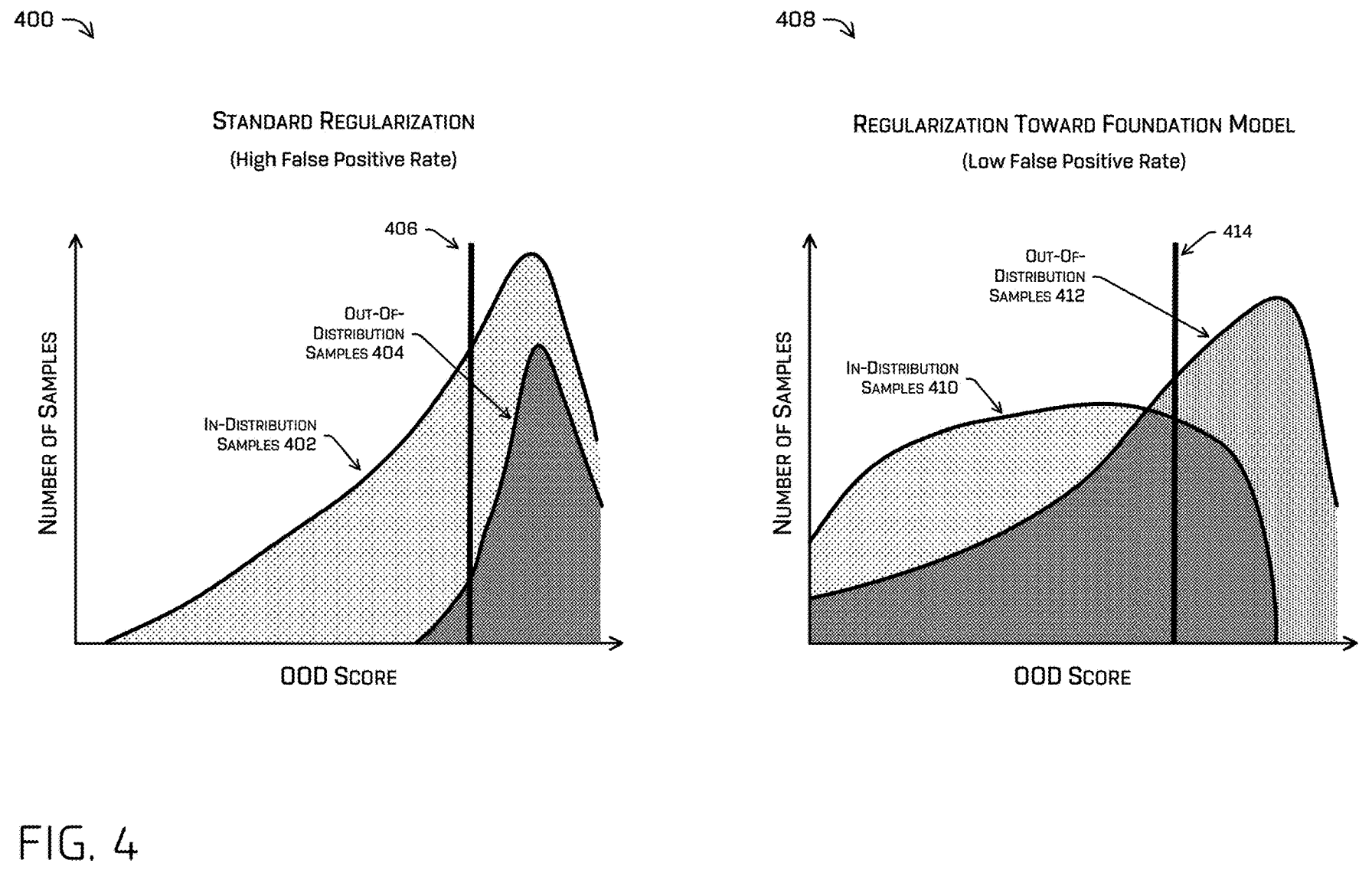

REGULARIZATION TOWARD FOUNDATION MODEL
(Low False Positive Rate)

408

414

OUT-OF-
DISTRIBUTION
SAMPLES 412

IN-DISTRIBUTION
SAMPLES 410

NUMBER OF SAMPLES

OOD SCORE

STANDARD REGULARIZATION
(High False Positive Rate)

406

OUT-OF-
DISTRIBUTION
SAMPLES 404

IN-DISTRIBUTION
SAMPLES 402

400

NUMBER OF SAMPLES

OOD SCORE

OBJECT CLASSIFICATION WITH OUT-OF-DISTRIBUTION DETECTION

BACKGROUND

Autonomous vehicles may include various software-based systems, hardware-based systems, and/or controllers to guide the vehicle through an environment. For example, a controller of an autonomous vehicle can use sensor data captured by sensor systems to perceive objects, predict trajectories, and plan and optimize routes to guide the vehicle through environments containing static and dynamic objects. In order to ensure safety for passengers as well as surrounding persons and objects, while traversing through congested areas with other moving vehicles (autonomous or otherwise), moving people, stationary buildings, etc., the autonomous vehicle may receive and analyze the sensor data in various ways to make driving decisions. For example, machine learning models may be trained based on empirical sensor data to perform tasks such as object detection, segmentation, classification, trajectory prediction, and the like. However, in real-world driving environments, autonomous vehicles may encounter unusual or anomalous objects which are dissimilar to the training data used to train the machine learning models operating on the vehicle. In these cases, the trained models may output inaccurate predictions for the anomalous inputs, which can cause the downstream vehicle components to perform inefficient or potentially unsafe driving behaviors.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 4 illustrates two example graphs depicting the performance of out-of-distribution detectors constructed based on different regularization techniques when training the associated machine learning model, in accordance with one or more examples of the disclosure.

DETAILED DESCRIPTION

Figure 1:
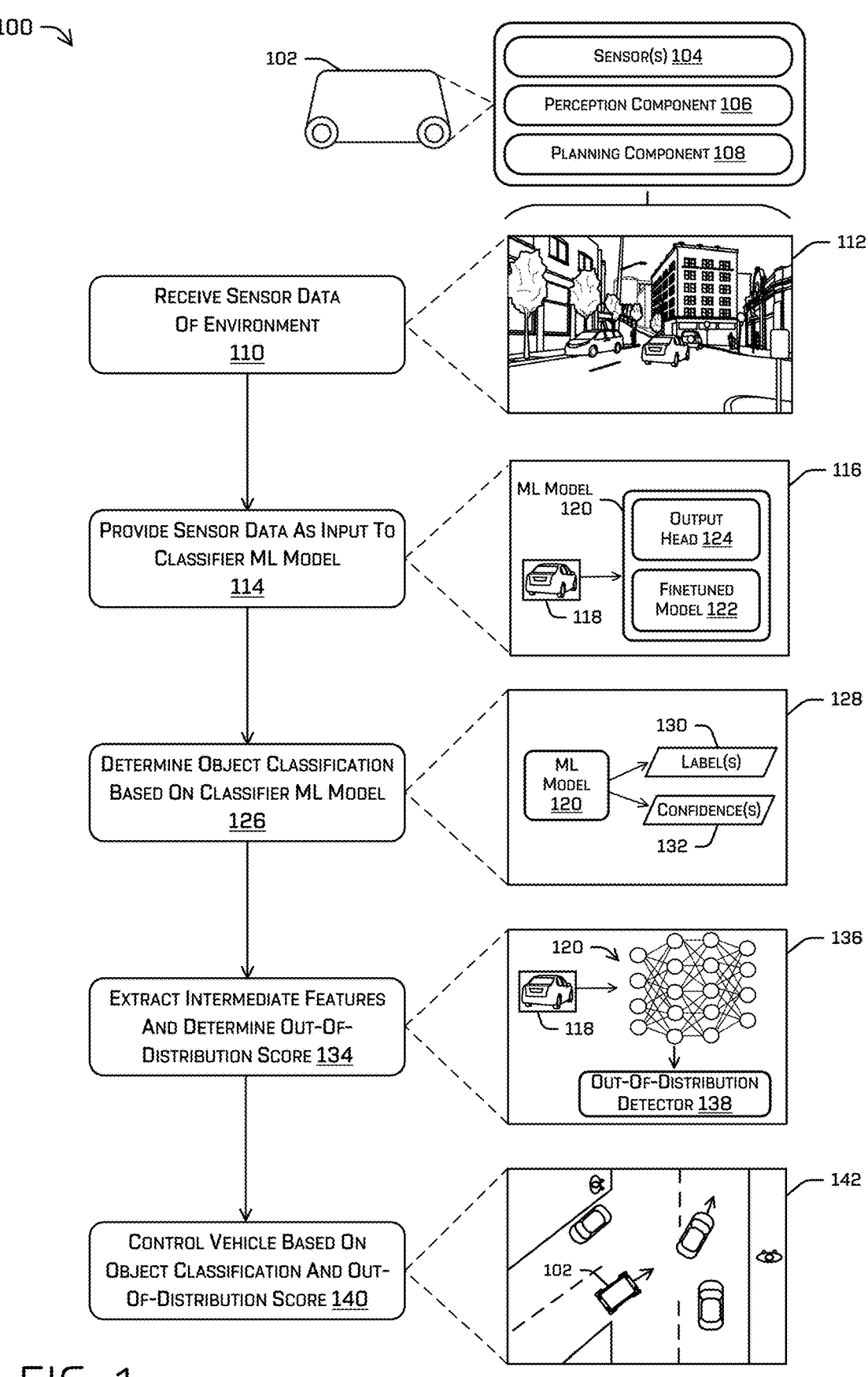
FIG. 1 illustrates an example technique of using a machine learning object classifier model and an associated out-of-distribution detector to classify an object and control a vehicle in a driving environment, in accordance with one or more examples of the disclosure.

Techniques described herein relate to constructing and using out-of-distribution (OOD) detectors to accurately and efficiently identify OOD inputs to trained machine learning (ML) models. As described herein, OOD inputs are those that are unusual, anomalous, or otherwise dissimilar to the training data used to train the machine learning models. An OOD detector may be constructed while training a machine learning model including a deep neural network, by extracting and modeling the intermediate features within the deep neural network during the model training. In some examples, the OOD detector may include a Gaussian mixture model (GMM) constructed to model the density of the intermediate features of the deep neural network, based on the in-distribution training data for the ML model. Additionally, in some cases, the intermediate features extracted for the OOD detector may be intermediate features of a finetuned model based on a pretrained model (e.g., a foundation model), wherein the additional layers of the ML model are finetuned with regularization toward the original weights of the foundation model. The OOD detector may be used in conjunction with the trained ML model, to detect likely OOD inputs to the model, and to modify or calibrate the outputs of the ML model in order to prevent passing inaccurate outputs from the trained model to downstream systems.

The techniques herein may be applicable to various types of ML models, such as object detection models and/or object classification models using convolutional neural networks (CNNs). However, these techniques for constructing and using OOD detectors may be applicable to various other deep-learning architectures, including transformers, recurrent neural networks (RNNs), long short-term memory networks (LSTMs), multilayer perceptrons (MLPs), foundation models, and the like. Various examples herein describe ML models trained based on various sensor data (e.g., image data, lidar data, radar data, depth data, etc.) that may be used to control autonomous vehicles within driving environments. Examples of trained ML models in autonomous vehicles may include models trained to perform tasks such as object detection, object segmentation, object classification, object tracking, trajectory prediction, and the like, based on individual sensor data and/or combinations of sensor data modalities. However, the techniques for constructing and using an OOD detector to determine likely OOD inputs to a trained ML model and supplementing or calibrating the outputs of the ML model based on the OOD detection as not limited to use in vehicles (autonomous or otherwise), but also may be used for deep-learning architecture models trained to perform other tasks in various other systems and environments. For instance, constructing and using OOD detectors as described herein may be applied to ML models trained to perform computer vision operations, natural language processing, bioinformatics, speech recognition, statistical classification, and the like.

Within various fields, machine learning models using deep-learning architectures may be trained based on empirical training data (e.g., in-distribution data) to perform tasks such as classification, prediction, analysis, etc. For example, CNNs may be trained using real-world sensor data to perform object detection, object segmentation, object classification, trajectory prediction, and the like. Properly trained ML models may generally perform well during inference, when the input samples provided to the model are similar to the training data used to train the model. However, when an input sample provided to the model is dissimilar (e.g., OOD data) from the training data, the model output may be inaccurate and unreliable. This inaccuracy and unreliability also extends to probabilities and/or confidence levels output by the ML model (e.g., for models trained to output confidence values associated with classifications or predictions) when the input data to the model is OOD data.

In autonomous vehicles, accuracy and reliability errors caused by OOD inputs to the trained ML models used for object detection, object classification, trajectory prediction, and the like, can negatively impact driving safety and efficiency. In real-world driving environments, autonomous vehicles may frequently encounter objects that are unlike objects within the ML model training data. For example, anomalous or outlier objects that may be encountered in a driving environment may include different vehicles (e.g., trucks, tricycles, motorcycles, bicycles, etc.) that have a new or unique type, appearance, or capabilities. Autonomous vehicles also may perceive unusual roadside objects, road debris, objects within construction or accident scenes, and the like, that are dissimilar to objects within the training data for their ML models. As used herein, anomalous or outlier objects (or other outlier inputs to models) that are not sufficiently represented in the training data for a deep-learning ML model may be referred to as an out-of-distribution (OOD) input.

As noted above, OOD inputs to trained deep-learning ML models may cause the models to output inaccurate and/or unreliable predictions or classifications (including confidences). These accuracy and reliability errors cannot be resolved by different training techniques, because an OOD input is (by definition) not available as training data when training the model (and/or rare so as to increase prediction uncertainty associated with an output). A number of existing systems have attempted to address the problem of OOD inputs to trained models; however, these existing systems lack the speed, efficiency, or flexibility of the OOD detector techniques described herein. For example, certain existing systems implement OOD detectors as binary classifier ML models which are trained and executed separately from the ML models with which they are associated. However, these systems often perform no better than the associated ML models, while consuming significant additional memory and computational overhead during training and inferences, which makes these systems impractical in many computing environments and applications (such as autonomous vehicles). Additionally, existing OOD detectors may provide outputs that indicate only whether the result of the ML can be trusted. Such OOD detectors May be used to determine which model outputs should be retained or discarded but may be unsuitable for more nuanced or robust solutions in which the OOD detector output may be used to modify or calibrate the output of the ML model. Finally, certain existing OOD detectors may be operable only for ML models trained to perform multiclass classification (e.g., one label is output for a given), but may be inapplicable for ML models trained to provide multilabel outputs (e.g., any number of labels can be relevant for a given input).

To address the technical problems and inefficiencies of existing OOD detectors, the techniques described herein may provide more effective and efficient OOD detectors for deep-learning ML models. As described herein, an OOD detector may be constructed by extracting and modeling the density of the intermediate features within the deep neural network (e.g., using a Gaussian mixture model) while the ML model is being trained. In some examples, the ML model may include a pretrained foundation model with additional neural network layers that are finetuned to perform the specific task (e.g., classification or prediction) but also regularized toward the original weights of the foundation model. The techniques herein may allow the OOD detector to output OOD scores that exhibit a noticeable separation between in-distribution and out-of-distribution inputs. The OOD detector also may be highly efficient to execute, requiring only a small number of additional computations (e.g., GMM calculations) to the inference operations of the trained ML model. The OOD detector as described herein may be used to improve the outputs of the associated ML model, for example, by providing the OOD detector output as a separate signal to a downstream system or using the OOD detector output to calibrate the confidence outputs of the trained ML model.

In some cases, the techniques herein may be implemented by training the deep-learning ML model based on a pretrained foundation model. For instance, an image-based object detection or classification model for use in an autonomous vehicle can be constructed based on a pretrained foundation model for image classification (e.g., MobileNet-v2, DINO-v2, etc.) and additional neural network layers on top of the pretrained foundation model. The additional neural network layers may include, for example, one or more CNNs, RNNs, LSTMs, MPLs, and/or transformers, etc., which can be trained to perform the specific object detection or classification task for the autonomous vehicle. In such examples, the ML model can leverage the robust general-purpose image classification functionality of the pretrained foundation model, and then train the additional neural network layers on top of the foundation model to perform vehicle-specific tasks such as object detection, segmentation, classification, trajectory prediction and other analysis for various roadway objects (e.g., other vehicles, bicycles, pedestrians, traffic objects, etc.) and various driving scenarios. Additionally, although the pretrained foundation models in these examples may be image classification models, additional foundation models may include pretrained models for analyzing lidar data, radar data, depth data, audio data, and/or various other types of sensor data.

When the trained ML model uses a pretrained foundation model, the OOD detector may be constructed based on intermediate features extracted from the neural network layers of the foundation model and/or the additional neural network layers on top of the foundation model. However, as discussed in more detail herein, a trained ML model that is finetuned to perform a specific task (e.g., object detection or classification for an autonomous vehicle) may exhibit strong feature aliasing toward optimizing the performance of the specific task. Thus, in some examples, the performance of the OOD detector can be improved by constructing the OOD detector based on intermediate features extracted from the foundation model and not from the finetuned additional layers on top of the foundation model. Additionally or alternatively, the intermediate features can be extracted from the additional layers on top of the foundation model that are relatively closer to the foundation model, and thus still retain some of the characteristics of the foundation model.

In some examples, the OOD detector may generate the OOD scores for input samples based on a model of the density of intermediate features of the neural network. For instance, during the training of the ML model to perform a specific task, a training component may extract one or more features from the intermediate layers of the deep neural network (e.g., features in or near the pretrained foundation model), and model the density of the extracted intermediate features. As noted above, a Gaussian mixture model (GMM) may be used in some examples to model the density of intermediate features, which may provide advantages in computationally efficiency and memory efficiency when executing an OOD detector during inference. In other examples, additional techniques (e.g., K-nearest neighbors (KNN)) may be used to model of the density of intermediate features. In these examples, modeling the density of the intermediate features of the deep neural network also may provide advantages of being applicable to multilabel ML models (e.g., the ML model may be trained to output any number of relevant labels for a given input). However, in other examples, the techniques described herein may be implemented with OOD detectors that do not model the density of the intermediate features, such as a MaxLogit OOD detector, JointEnergy OOD detector, or Mahalanobis-Multilabel OOD. Each of these OOD detectors can be extended from a multiclass setting (e.g., the ML model outputs a single class for a given input) to a multilabel setting (e.g., the ML model outputs any number of relevant labels for a given input).

During the training of the ML model, the model may be finetuned to perform the specific task (e.g., object detection, segmentation, classification, tracking, etc.), while also regularizing the model toward the original weights of the foundation model. In some examples, the training component may use L2 Starting Point (L2-SP) regularization to train the ML model, using a starting point based on the initialization of the pretrained foundation model. As described herein, strong regularization of the ML model toward the original weights of the foundation model may improve the performance of the OOD detector by providing better separation between the OOD scores of in-distribution samples and out-of-distribution samples.

After using the OOD detector to generate an OOD score for a sample during inference, the object classifier (or other component) executing the ML model may use the OOD score in various ways to improve the output of the ML model and the overall operation of the classifier. In some examples, the object classifier may provide both the output of the ML model (e.g., a multilabel output associated with the input sample) and the OOD score determined by the OOD detector to a downstream system (e.g., a planning component of an autonomous vehicle). In other examples, the object classifier may be configured to modify the probability and/or confidence data output by the ML model for an input sample, based on the OOD score for the input sample. For instance, in response to a relatively high OOD score (indicating that the input is potentially or likely to be out-of-distribution), the confidence values output by the ML model may be modified down. In contrast, in response to a relatively low OOD score (indicating that the input is likely in-distribution), the confidence values may be retained or modified up. In some implementations, weighting or otherwise modifying the confidence and/or probability values output by the ML model may provide advantages of improving the performance of the ML model in a way that is transparent and does not require any structural changes to the downstream systems.

FIG. 1 depicts an example process 100 including using an ML model (e.g., a deep-learning object detector and/or classifier model) and an associated OOD detector to classify an object and control a vehicle in a driving environment. As shown in this example, some or all of the operations in process 100 may be performed by components within a vehicle 102, including sensors 104, a perception component 106, and/or planning component 108. However, in other examples, the various operations of process 100 are not limited to vehicles (autonomous or otherwise) and may be performed by other systems configured to execute deep-learning ML models.

At operation 110, the sensor(s) 104 of the vehicle 102 may capture various sensor data of a driving environment and provide the sensor data to the perception component 106 for analysis. The sensor data received in operation 110 may include, but is not limited to, lidar data, radar data, sonar data, time-of-flight data, and/or other depth data, as well as image and/or video data. In some examples, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 102 may be a fully or partially autonomous vehicle having any other level or classification. It is contemplated that the techniques discussed herein may apply to more than robotic control, such as for autonomous vehicles. For example, the techniques discussed herein may be applied to mining, manufacturing, augmented reality, etc. Moreover, even though the vehicle 102 is depicted as a land vehicle, vehicle 102 may be an aircraft, spacecraft, watercraft, and/or the like. In some examples, vehicle 102 may be represented in a simulation as a simulated vehicle. For simplicity, the discussion herein does not distinguish between a simulated vehicle and a real-world vehicle. References to a "vehicle" may therefore reference a simulated and/or a real-world vehicle.

In operation 110, the vehicle 102 may use the sensor(s) 104 to capture, store, and/or preprocess various sensor data. (e.g., fusing data from the different sensors and/or sensor modalities, resolving errors or inconsistencies in the sensor data, etc.). The perception component 106 may be configured to analyze the sensor data captured by the sensors 104 to detect (or perceive) various additional objects in the environment (e.g., other vehicles, bicycles, pedestrians, animals, static objects, etc.), and to determine state data for the various perceived objects (e.g., object classifications, sizes, shapes, positions, locations, trajectories, velocities, accelerations, etc.). The planning component 108 may be configured to determine a trajectory for controlling operation of the vehicle 102 based on the objects perceived by the perception component 106 (as well as based on predictions determined by a prediction component).

In some cases, operation 110 also may include receiving map data (e.g., road network and/or static object data) associated with the environment, or a portion thereof in which the vehicle 102 is traversing. Additionally or alternatively, operation 110 may include analyzing the sensor data to perceive road boundaries, sidewalks, crosswalks, road and traffic signal data (e.g., traffic light states, road permissibility, etc.), as well as various attributes of the driving scene itself (e.g., weather conditions, lighting conditions, road conditions, etc.). As shown in this example, box 112 may represent sensor data captured by a vehicle 102 while traversing a driving environment. The sensor data in this example includes data representing a number of agents, static objects, road and map features, etc.

At operation 114, the vehicle 102 may execute one or more ML models to analyze (e.g., detect, classify, or determine predictions for) the sensor data received in operation 110. In this example, the ML model may include an object classifier model configured to receive sensor data as input (e.g., image data, lidar data, radar data, multimodal data, etc.) and classify the sensor data by determining an object and/or object state data corresponding to the sensor data. As shown in box 116, a portion of the sensor data captured within the driving environment may be provided as an input 118 to an ML model 120. In this example, the input 118 includes an image input that has been segmented to correspond to a particular object, and the ML model 120 may be an image-based object classifier configured to determine an object classification (e.g., vehicle) and/or state data (e.g., size, orientation, speed, vehicle lights classification, etc.). In other examples, the ML model 120 may comprise another deep-learning ML model trained to perform the various functionality of the perception component 106, the planning component 108, a prediction component, and/or other components of the vehicle 102, based on any type or combination of sensor data.

As shown in this example, the ML model 120 may be a deep-learning neural network model including a finetuned model 122 (e.g., an object classifier model) and an output head 124 comprising additional neural network layers configured to operate on top of the finetuned model 122. As described below in more detail, the finetuned model 122 may be trained (e.g., finetuned) based on a pretrained ML model. A pretrained ML model may include, for instance, a foundation model, pretrained general-purpose classifier or predictor model, or a variational autoencoder. In some examples, the pretrained ML model may be trained to perform an initial task, such as a general-purpose image classifier, and the finetuned model 122 may be trained further to perform a different particular task (e.g., object detection or classification for vehicles and/or roadway objects in a driving environment). The finetuned model 122 may begin as a copy of the pretrained ML model, and then may be trained (or finetuned) using additional training data to perform its particular task. In various examples, the pretrained ML model used to generate the finetuned model may be a foundation model such as a general-purpose image classifier, lidar classifier, radar classifier, etc. Training the finetuned model 122 may include modifying and/or adding layers to the pretrained foundation model which are finetuned to perform the specific task (e.g., image-based object classification for a vehicle 102). The pretrained ML model and/or the finetuned model 122 may be implemented, for example, as a CNN, GNN, RNN, MLPs, transformer, or any combination of deep-learning ML components. During training, the ML model 120 may be trained to optimize the performance of the specific task by finetuning (e.g., adjusting weights, thresholds, encoding/decoding layers, etc.) the copy of the model based on the original pretrained foundation model.

At operation 126, the ML model 120 may provide one or more outputs based on the input 118 provided to the model in operation 114. In this example, the ML model 120 may be an object classifier model within the perception component 106 of the vehicle 102. Accordingly, the output of the ML model 120 may include one or more labels representing object classifications and/or attributes. As shown in box 128, the ML model 120 may be trained to output one or more label(s) 130 and corresponding confidence values associated with each label. In some examples, the ML model 120 may be a binary classification model or a multiclass model, in which case the ML model 120 may output a single label 130 based on a particular input 118. However, in other examples, the ML model 120 may be a multilabel model in which multiple labels 130 may be output based on a particular input 118. One example of a multilabel model is a vehicle lights classifier model, in which the model may be trained to output multiple relevant labels corresponding to the different lights that may be activated on the vehicle. Because the vehicle may have zero, one, or multiple light systems activated simultaneously (e.g., brake lights, left or right turn signal, and/or emergency lights, etc.), the vehicle lights classifier may be multilabel configured to output multiple labels 130 corresponding to the different lights systems on the vehicle. Other examples of multilabel models may include instance segmentation and/or semantic segmentation models configured to determine the boundaries between multiple objects and/or types of objects within a driving environment, and/or multidimensional size models configured to output different labels corresponding to different size dimensions of an object (e.g., length, width, and height).

As shown in this example, the ML model 120 also may be configured to output confidence values 132 associated with the labels 130. Confidence values 132 may be trained outputs representing the likelihood that the labels 130 are an accurate classification, detection, and/or prediction based on the input data. For example, when the ML model 120 is trained to output (via a label 130) a distance, size, object class/type, and/or yaw angle of the object represented in the input 118, the confidence value(s) 132 may represent the learned confidence levels that the ML model 120 has in the predictions. In examples when the ML model 120 is a multilabel model, the model may output a separate confidence value 132 for each label 130, or may output a single confidence value 132 applicable to all labels 130.

At operation 134, during the execution of the ML model 120, the vehicle 102 (e.g., the perception component 106) may extract intermediate features from the deep neural network of the ML model 120. The vehicle 102 may use the extract features as input for an OOD detector configured to output an OOD score associated with the input 118 to the ML model 120. As shown in box 136, the ML model 120 includes a multilayer (or deep) neural network. During the execution of the ML model 120, the perception component 106 may be configured to extract a predetermined set of features out of the deep neural network and provide those features (e.g., as a feature vector) to the OOD detector 138. As noted above, the intermediate features extracted during execution of the ML model 120 may include features from the finetuned model 122 and/or features from additional neural network layers and/or an output head 124 of the object classifier.

As described below in more detail, the OOD detector 138 may include a density estimation model (e.g., a Gaussian mixture model (GMM)) trained based on the same corresponding intermediate features extracted while training the ML model 120 with in-distribution training data to model a density of a vector space associated with the feature vector. In these examples, the OOD detector 138 may be configured to receive the extracted features from the ML model 120 and use the features to execute the GMM including Gaussian parameters to determine an OOD score for the input 118.

At operation 140, the vehicle 102 may be controlled based (in part) on the output of the ML model 120 determined in operation 126, and the output of the OOD detector determined in operation 134. For example, the vehicle 102 may use the sensors 104 and the perception component 106 to perceive the driving environment, including detecting, classifying, and analyzing various other static and dynamic objects using the techniques described herein. The vehicle 102 also may include a prediction component (not shown) configured to determine predicted trajectories and/or predicted future states of the objects in the environment. As shown in box 142, based on the perceived object data, the predicted trajectories, and various additional data (e.g., map data, road network data, the state and intended destination of the vehicle 102), the vehicle 102 may use a planning component 108 to determine a trajectory (or multiple trajectories) for controlling the vehicle 102 within the driving environment.

As noted above, the output of the OOD detector 138 may be used in various ways by downstream components to control the vehicle 102. In some examples, the OOD detector may provide one or more OOD scores associated with the outputs of trained ML models (e.g., perception models, trajectories prediction models, localization models, etc.) directly to downstream systems such as a prediction component or the planning component 108. In such examples, the downstream systems may be configured to use the OOD scores as inputs to their respective models and systems used to control the vehicle 102. For instance, a downstream prediction component may take into account the OOD scores associated with an object detected and classified by the perception component 106, to generate the most likely trajectories for the object and the confidences associated with those trajectories. In other examples, the OOD scores generated by the OOD detector 138 may be used to overwrite and/or modify (e.g., weight) the confidence values 132 output by the ML model 120 in a manner transparent to the downstream systems. For instance, low OOD scores may correlate to less accurate and/or reliable label(s) 130 output by the ML model 120, and high OOD scores may correlate to more accurate and reliable label(s) 130. In these examples, the ML model 120 (or other perception component system) may use the OOD scores to weight or otherwise modify the confidence values 132, after which the label(s) 130 and modified confidence score(s) may be transmitted as normal to the appropriate downstream systems.

Figures 2A, 2B:
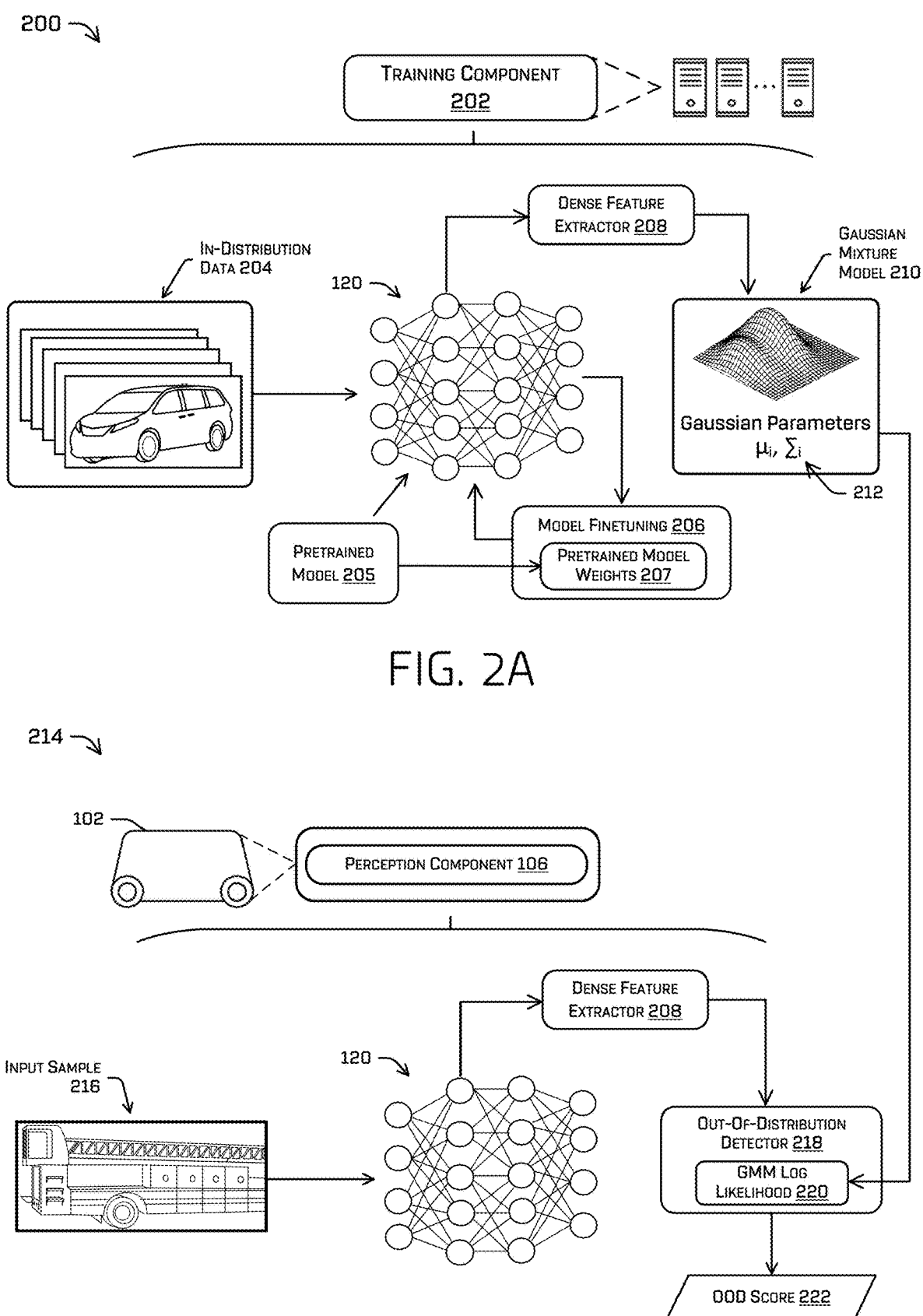
FIG. 2A illustrates an example technique of constructing an out-of-distribution detector by modeling features extracted from a machine learning model into a Gaussian mixture matrix, in accordance with one or more examples of the disclosure.
FIG. 2B illustrates an example technique of using the out-of-distribution detector constructed in FIG. 2A to determine an out-of-distribution score for an object, in accordance with one or more examples of the disclosure.

FIG. 2A depicts an example system 200 including a training component 202 configured to construct and train an out-of-distribution detector associated with a deep-learning ML model. The training component 202 in this example may use training data 204 (e.g., in-distribution data) to train an ML model 120. As shown in this example, the training data 204 may include vehicle images for training an object classifier ML model (e.g., a vehicle type classifier, vehicle lights classifier, vehicle size/trajectory classifier, etc.). In various other examples, the training data 204 may include other types of input data (e.g., additional sensor modalities), used alone or in combination, to train deep learning ML models to perform various tasks (e.g., object detection, classification, segmentation, analysis, prediction, etc.).

As described above, the ML model 120 may be finetuned based on a pretrained model 205 trained to perform a distinct (e.g., but related) task. For instance, the pretrained model 205 may be a general-purpose image classification model (or classification model based on other sensor data modalities) that can be used as a foundation model. In other examples, the pretrained model 205 may be a variational autoencoder trained to output general-purpose encodings based on sensor data. The ML model 120 may be constructed by initially copying the pretrained model 205, including the neural network structure and original weights of the pretrained model 205, after which the ML model 120 may be further trained (or finetuned) to perform a different particular task (e.g., on-vehicle object detection, classification, segmentation, analysis, prediction, etc.). For training the ML model 120, various model finetuning components 206 (not shown in detail here) may include any number of components such as ML algorithms, loss functions, backpropagation components, and the like. To train the ML model 120, the sequence of training data 204 may be provided as input to the deep neural network of the ML model 120, after which the DNN may be adjusted (e.g., weights, thresholds, node structure, etc.) to improve/optimize the model with respect to perform its specified task (e.g., object classification for an autonomous vehicle). In various examples, the ML model 120 may be trained/finetuned using supervised learning (e.g., based on labeled training data 204) or unsupervised learning techniques. The various techniques used to train/finetune the ML model 120 may include, but are not limited to, any of the ML algorithms and/or neural network architectures described herein.

As shown in this example, when training/finetuning the ML model 120, the model finetuning components 206 also may use the original weights 207 of the pretrained model 205. For instance, when finetuning the ML model 120, the ML model 120 may be trained based on training data to perform its particular task (e.g., object classification for an autonomous vehicle) while also regularizing the ML model 120 toward the original weights 207 of the pretrained model. In some examples, the model finetuning components 206 may use L2 Starting Point (L2-SP) regularization to train the ML model 120, using a starting point based on the original weights 207 of the pretrained model 205. As described below, by regularizing the ML model 120 toward the original weights 207 of the pretrained model 205, the finetuned model 120 may retain a portion of the expressivity of the pretrained model 205. This may improve the performance of the OOD detector by providing better separation between the OOD scores of in-distribution samples and out-of-distribution samples.

During the training of the ML model 120, an OOD detector associated with the ML model 120 also may be constructed (and/or trained). As described herein, an OOD detector for the ML model 120 may be constructed by modeling the density of intermediate features within the deep neural network of the ML model 120 (e.g., within the foundation model). For instance, after the ML model 120 has been completely (or sufficiently) trained to perform its specified task, the dense feature extractor 208 may extract a set of features from the intermediate layers of the neural network. In some examples, a corresponding set of intermediate features may be extracted for each of the training data 204. A Gaussian mixture model (GMM) 210 may be used to model the density intermediate features extracted while training the ML model 120. The GMM 210 may be single or multi-dimensional and may be generated by determining Gaussian parameters 212. In this example, for a GMM 210 having a single cluster (or single Gaussian), the Gaussian parameters 212 may include the mean ($\mu_i$) and covariance ($\Sigma_i$) of the Gaussian. In other examples, for multi-dimensional GMMs 210 (e.g., GMMs having multiple clusters/Gaussians), the Gaussian parameters 212 may include a separate mean ($\mu_i$) and covariance ($\Sigma_i$) for each Gaussian/cluster. In some cases, when modeling the GMM 210, the system 200 may include one or more tools to evaluate the how well a current GMM 210 models the intermediate features. Based on thresholds representing the accuracy of the GMM 210, the system 200 may be configured to further modify the GMM 210, and/or construct a new GMM 210 having a different (e.g., additional) number of clusters/Gaussians.

FIG. 2B depicts another example system 214, in which the GMM 210 generated while training the ML model 120 may be used by an OOD detector 218 during execution of the ML model 120. During inference, the trained ML model 120 may receive an input sample 216 and process the sample via the deep neural network to determine the outputs of the ML model (e.g., an object classification and/or other analysis/predictions, corresponding confidence values, etc.).

As discussed above, the training data 204 used to train the ML model 120 and construct the GMM 210 may be, by definition, in-distribution data. However, at inference, each input sample 216 may be in-distribution or out-of-distribution, and the finetuned ML model 120 may be ill-equipped to determine whether (and the degree to which) an input sample 216 may be an out-of-distribution (OOD) sample. Therefore, when the ML model 120 is executed during inference, the OOD detector 218 may be used in conjunction to determine the likelihood that the input sample 216 is an OOD input (and/or to determine a value indicating by how much the input sample 216 is OOD).

When the ML model 120 is executed to evaluate an input sample 216, the dense feature extractor 208 may be used to extract the corresponding set of features from the same intermediate layers of the neural network. The intermediate features extracted from the ML model 120 may be provided to the OOD detector 218, which may use algorithms and/or equations (e.g., GMM log likelihood 220) to compute an OOD score 222 associated with the input sample 216. In some examples, the equations used by the OOD detector 218 may include one or both of Equation 1 and Equation 2 below, which may represent techniques for calculating the log of the likelihood that a feature vector provided as input to the equations is drawn from the same distribution as the feature vectors used to model the GMM 210 (e.g., the feature vectors representing the training data 204):

$$(x-\mu)^T \Sigma^{-1} (x-\mu) \qquad \text{Equation 1}$$

$$\|L^T(x-\mu)\|_2^2 \qquad \text{Equation 2}$$

In these equations, x may represent the set of intermediate features extracted from the ML model 120 during inference. As noted above, $\mu$ and $\Sigma$ may be Gaussian parameters 212 respectively representing the mean and the covariance of a one-dimensional (e.g., single cluster/Gaussian) GMM 210. In Equation 2, L may equal cholesky $\Sigma^{-1}$. In this example, Equation 1 and Equation 2 may be used individually or in combination to generate OOD scores 222 associated with input samples 216; however, Equation 2 may be more efficient in some implementations. Thus, in some examples, the OOD scores 222 may represent the log likelihood of the GMM 210 defined over the latent features of a pretrained model 205. As described herein, these OOD scores 222 may be used to determine the likelihood of a particular input sample 216 being out of distribution.

Figure 3:
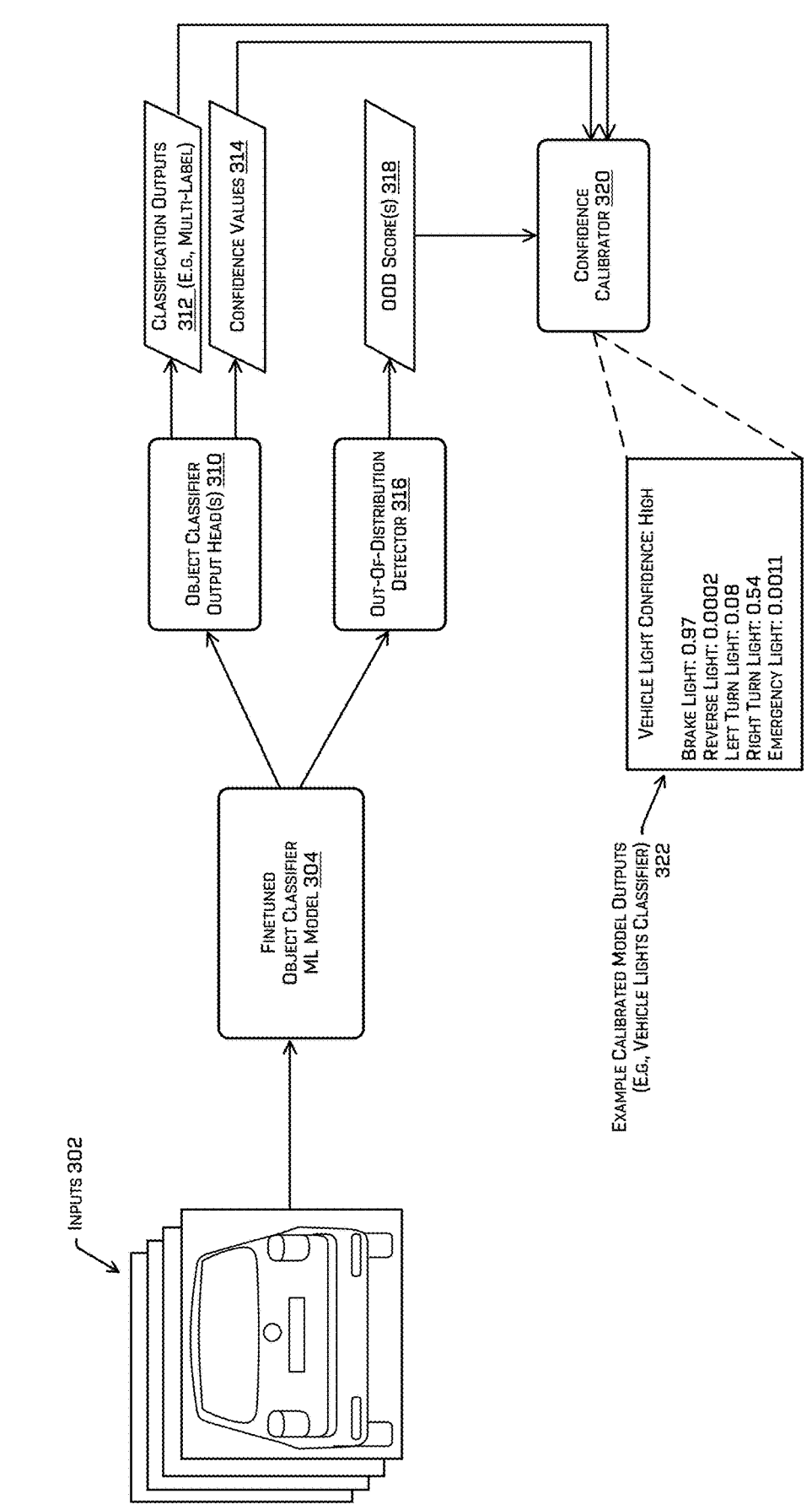
FIG. 3 illustrates an example system associated with a machine learning object classifier model and associated out-of-distribution detector, in accordance with one or more examples of the disclosure.

FIG. 3 depicts an example architecture for an object classifier 300 including a deep-learning ML model that has been finetuned for object classification, and an associated OOD detector configured to identify OOD inputs to the ML model. In some examples, the object classifier 300 may be a multilabel classifier configured to output any number of relevant labels based on a given input. For instance, a vehicle lights classifier may be configured to output multiple vehicle light indicators (e.g., brake lights, turn signals, emergency lights, etc.) and associated confidence values for each vehicle light indicator. Other examples of multilabel classifier models that may be used by an autonomous vehicle may include instance segmentation and/or semantic segmentation models, size classification models, and/or other multilabel object attribute models.

As shown in this example, the object classifier 300 may be configured to receive input samples 302 from one or more upstream systems (e.g., sensor systems) and provide the samples to a finetuned object classifier ML model 304. In the case of object classifiers for autonomous vehicles, the input samples 302 may include images and/or other sensor data (e.g., lidar, radar, depth, audio, etc.) associated with various objects perceived in a driving environment. The finetuned object classifier ML model 304 may be a multilayer deep-learning architecture trained to perform a particular task, based on a pretrained model (e.g., a foundation model, general-purpose classifier, variable autoencoder, etc.) configured to perform a different task. For example, the pretrained model may be trained to perform general-purpose sensor data classification, and the finetuned object classifier ML model 304 may be finetuned with additional training to perform a different specific task (e.g., object segmentation, vehicle type classification, vehicle size/yaw classification, vehicle lights classification, etc.). Training the object classifier ML model 304 may include finetuning (e.g., adjusting weights, thresholds, encoding/decoding layers, etc.) a copy of the pretrained model and/or adding one or more additional deep-learning network layers (e.g., CNNs, RNNs, MLPs, transformers, etc.).

As shown in this example, the finetuned object classifier ML model 304 may output, via one or more output heads 310, the outputs of the trained model. In some cases, the output heads 310 may include separate heads for different classification outputs 312 (e.g., different relevant labels applicable to the object) and/or associated confidence values 314. The finetuned object classifier ML model 304 and/or output heads 310 may be designed to output a single confidence value 314 associated with the multilabel classification outputs 312 or may be designed to output a separate confidence value 314 associated with each of the multilabel classification outputs 312 (e.g., two different confidence values for two classification labels, five different confidence values for five classification labels, etc.).

In this example, the finetuned object classifier ML model 304 also may provide an output to the OOD detector 316, which may include a set of intermediate features extracted from the deep-learning layers of the finetuned ML model 304. As noted above, it may be advantageous in some cases to extract the intermediate features of the finetuned ML model 304 from the layers of the model corresponding to (e.g., similar or identical to) the layers of the pretrained model upon which the finetuned model is based, and/or from the additional network layers that are relatively closer to the layers of the pretrained foundation model (and thus still retain some of the characteristics of the foundation model). Using the extracted intermediate features from the finetuned ML model 304, the OOD detector 316 may determine one or more OOD scores associated with each input sample 302. The OOD detector 316 may include a GMM fit during training to model the density of the intermediate features. In these examples, the operations performed by the OOD detector 316 may include a small number of lightweight GMM operations (e.g., vector subtractions and matrix multiplications) to efficiently compute an OOD score based on the GMM (e.g., using the GMM log likelihood 220) corresponding to the extracted intermediate features.

In some examples, deep-learning systems such as the object classifier 300 may be configured to provide the outputs of the finetuned ML model 304 (e.g., classification outputs 312 and/or confidence values 314) and the associated OOD score(s) 318 determined by the OOD detector 316, to one or more downstream systems (e.g., a prediction component, a planning component, etc.). However, in other instances, the OOD score(s) 318 determined by the OOD detector 316 may be used to calibrate (e.g., weight or modify) the confidence values 314 output by the finetuned ML model 304. As noted above, the OOD scores 318 may represent the log likelihood of a GMM for a particular input 302 (e.g., the log of the likelihood that the input 302 is out-of-distribution, based on a GMM defined over the latent features of a pretrained model 205). In some examples, the OOD scores 318 representing the log likelihood of the GMM can be interpreted as (and/or used to determine) a probability that a classification output 312 of the finetuned ML model 304 is erroneous. In this example, a confidence calibrator 320 may be used to replace or modify the confidence values 314 output by the finetuned ML model 304, based on the OOD score(s) 318. For instance, when an OOD score 318 for an input sample 302 is relatively high (e.g., exceeds one or more score thresholds) indicating that the input sample 302 is potentially or likely an OOD input, the confidence calibrator 320 may modify (e.g., by down-weighting) the confidence values 314 output by the fine-tuned ML model 304. In contrast, when an OOD score 318 for an input sample 302 is relatively lower (e.g., below one or more score thresholds) indicating that the input sample 302 is more likely to be an in-distribution input, the confidence calibrator 320 may retrain or increase the confidence values 314 output by the finetuned ML model 304. Box 322 illustrates an example set of multilabel classification outputs and probabilities for an object classifier 300 (e.g., a vehicle lights classifier). In this example, the calibrated outputs of the object classifier 300 include a label indicating an overall high confidence level for the classification outputs (e.g., based in part on the OOD score(s) 318), and probability values associated with each vehicle light system (e.g., which also may be calibrated based on the OOD score(s) 318).

As illustrated by these examples, by using the OOD score(s) 318 to calibrate the confidence values 314 rather than transmitting the OOD score(s) 318 as a separate output signal, the object classifier 300 may provide more accurate and reliable object classification data and confidence values to the downstream system(s). Further, the use of the OOD detector 316 and associated improvements in accuracy and reliability may be transparent to the downstream systems and need not require any downstream system to implement structural changes to receive and process the OOD score(s) 318.

FIG. 4 shows two example graphs depicting the performance of OOD detectors constructed using different regularization techniques when training the associated machine learning model. In these examples, graph 400 represents the performance of a first OOD detector constructed when training the model using a standard regularization, and graph 408 represents the performance of a second OOD detector constructed when training the model using strong regularization toward the foundation model. In these examples, the x-axis represents the OOD score output by the OOD detector and the y-axis represents the number of input samples receiving a particular OOD score.

In graph 400, the ML model associated with the OOD detector has been trained with a standard (e.g., L1 or L2) regularization. Line 402 depicts the distribution of the OOD scores for in-distribution input samples, and line 404 depicts the distribution of the OOD scores for out-of-distribution input samples. Line 406 represents a threshold OOD score that may be used for predicting whether an input sample is in-distribution or out-of-distribution. In this example, the false positive rate associated with the OOD detector used for graph 400 may be computed as the number of in-distribution samples erroneously classified as OOD (e.g., the in-distribution samples under line 402 to the right of line 406), over the total number of in-distribution samples (e.g., all samples under line 402). As shown in this example, when standard regularization techniques are used for training the ML model, there may be relatively little separation between the performance of the OOD detector for in-distribution and out-of-distribution samples, resulting in a comparatively high false positive rate.

In contrast, in graph 408 the ML model associated with the OOD detector has been trained with a strong regularization toward the original weights of the foundation model. For example, the OOD detector in graph 408 may be constructed using L2 Starting Point (L2-SP) regularization to train the associated ML model, using a starting point based on the initialization of the pretrained foundation model. In this example, line 410 depicts the distribution of the OOD scores for in-distribution input samples, and line 412 depicts the distribution of the OOD scores for out-of-distribution input samples. Line 414 represents another threshold OOD score that may be used for predicting whether an input sample is in-distribution or out-of-distribution. As in the previous example, the false positive rate associated with the OOD detector used for graph 408 may be computed as the number of in-distribution samples erroneously classified as OOD (e.g., the in-distribution samples under line 410 to the right of line 414), over the total number of in-distribution samples (e.g., all samples under line 410). As shown in this example, when strong regularization is used toward the pretrained foundation model, greater separation between the performance of the OOD detector may be observed for in-distribution and out-of-distribution samples, resulting in a comparatively lower false positive rate and improved performance for the OOD detector.

Figure 5:
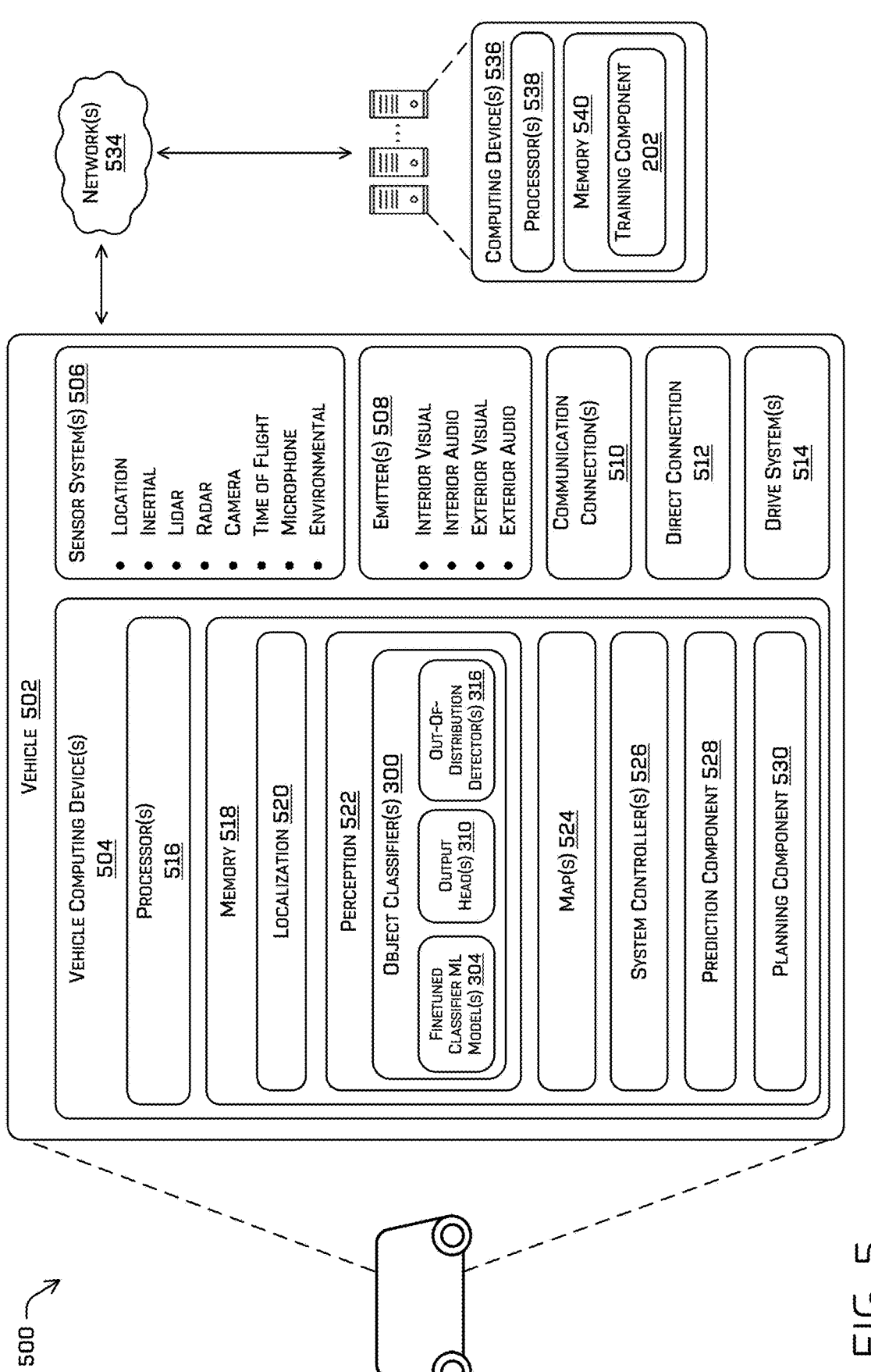
FIG. 5 depicts a block diagram of an example system for implementing various techniques described herein.

FIG. 5 depicts a block diagram of an example system 500 for implementing various techniques described herein. In some instances, the example system 500 may include a vehicle 502, which may represent the vehicle 102 discussed above in FIG. 1-4. In some instances, the vehicle 502 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 502 may be a fully or partially autonomous vehicle having any other level or classification. Moreover, in some instances, the techniques described herein may be usable by non-autonomous vehicles as well. These are merely examples, and the systems and methods described herein also may be incorporated into any ground-borne, airborne, or waterborne vehicle, including those ranging from vehicles that need to be manually controlled by a driver at all times, to those that are partially or fully autonomously controlled.

The vehicle 502 which can be configured to perform various techniques described herein, including constructing and using OOD detectors associated with trained deep-learning ML models (e.g., CNNs, transformer models, etc.) which may be deployed within the vehicle 502 while operating in a driving environment (e.g., object detection models, object classification models, etc.). In some examples, the vehicle 502 also may be configured to provide log data to one or more separate computing devices 536 configured to train ML models and the OOD detectors as described herein. Additionally or alternatively, the vehicle 502 may receive and execute one or more ML models and associated OOD detectors from the separate computing devices 536, which may be integrated within a perception component configured to detect, segment, classify, and track objects in the environment, based on multi-modal sensor data, using the various techniques described herein.

The vehicle 502 may include vehicle computing device(s) 504, sensor(s) 506, emitter(s) 508, network interface(s) 510, at least one direct connection 512 (e.g., for physically coupling with the vehicle to exchange data and/or to provide power), and one or more drive system(s) 514. In this example, the vehicle 502 may correspond to vehicle 102 discussed above. The system 500 may additionally or alternatively comprise computing device(s) 504.

In some instances, the sensor(s) 506 may include lidar sensors, radar sensors, ultrasonic transducers, sonar sensors, location sensors (e.g., global positioning system (GPS), compass), inertial sensors (e.g., inertial measurement units (IMUs), accelerometers, magnetometers, gyroscopes), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors), etc. The sensor(s) 506 may include multiple instances of each of these or other types of sensors. For instance, the radar sensors may include individual radar sensors located at the corners, front, back, sides, and/or top of the vehicle 502. As another example, the cameras may include multiple cameras disposed at various locations about the exterior and/or interior of the vehicle 502. The sensor(s) 506 may provide input to the vehicle computing device(s) 504 and/or to computing device(s) 536.

The vehicle 502 may also include emitter(s) 508 for emitting light and/or sound, as described above. The emitter(s) 508 in this example may include interior audio and visual emitter(s) to communicate with passengers of the vehicle 502. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners), and the like. The emitter(s) 508 in this example may also include exterior emitter(s). By way of example and not limitation, the exterior emitter(s) in this example include lights to signal a direction of travel or other indicator of vehicle action (e.g., indicator lights, signs, light arrays), and one or more audio emitter(s) (e.g., speakers, speaker arrays, horns) to audibly communicate with pedestrians or other nearby vehicles, one or more of which comprising acoustic beam steering technology.

The vehicle 502 may also include network interface(s) 510 that enable communication between the vehicle 502 and one or more other local or remote computing device(s). For instance, the network interface(s) 510 may facilitate communication with other local computing device(s) on the vehicle 502 and/or the drive systems(s) 514. Also, the network interface(s) 510 may additionally or alternatively allow the vehicle to communicate with other nearby computing device(s) (e.g., other nearby vehicles, traffic signals, etc.). The network interface(s) 510 may additionally or alternatively enable the vehicle 502 to communicate with computing device(s) 536. In some examples, computing device(s) 536 may comprise one or more nodes of a distributed computing system (e.g., a cloud computing architecture).

The network interface(s) 510 may include physical and/or logical interfaces for connecting the vehicle computing device(s) 504 to another computing device or a network, such as network(s) 534. For example, the network interface(s) 510 may enable Wi-Fi-based communication such as via frequencies defined by the IEEE 200.11 standards, short range wireless frequencies such as Bluetooth®, cellular communication (e.g., 2G, 3G, 4G, 4G LTE, 5G, etc.)

or any suitable wired or wireless communications protocol that enables the respective computing device to interface with the other computing device(s). In some instances, the vehicle computing device(s) 504 and/or the sensor(s) 506 may send sensor data, via the network(s) 534, to the computing device(s) 536 at a particular frequency, after a lapse of a predetermined period of time, in near real-time, etc.

In some instances, the vehicle 502 may include one or more drive systems(s) 514 (or drive components). In some instances, the vehicle 502 may have a single drive system 514. In some instances, the drive system(s) 514 may include one or more sensors to detect conditions of the drive system(s) 514 and/or the surroundings of the vehicle 502. By way of example and not limitation, the sensor(s) of the drive systems(s) 514 may include one or more wheel encoders (e.g., rotary encoders) to sense rotation of the wheels of the drive components, inertial sensors (e.g., inertial measurement units, accelerometers, gyroscopes, magnetometers) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive systems(s) 514. In some cases, the sensor(s) on the drive systems(s) 514 may overlap or supplement corresponding systems of the vehicle 502 (e.g., sensor(s) 506).'

The drive systems(s) 514 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive systems(s) 514 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive systems(s) 514. Furthermore, the drive systems(s) 514 may also include one or more communication connection(s) that enable communication by the respective drive component with one or more other local or remote computing device(s).

The vehicle computing device(s) 504 may include processor(s) 516 and memory 518 communicatively coupled with the one or more processors 516. Computing device(s) 536 may also include processor(s) 538, and/or memory 540. As described above, the memory 540 of the computing device(s) 536 may store and execute a training component 202, which may be similar or identical to the training component 202 described above in reference to FIG. 2A, and may be configured to perform any combination of training functionality for training deep-learning ML models and/or training (or constructing) OOD detectors 316 described herein.

The processor(s) 516 and/or 538 may be any suitable processor capable of executing instructions to process data and perform operations as described herein. By way of example and not limitation, the processor(s) 516 and/or 538 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 518 and/or 540 may be examples of non-transitory computer-readable media. The memory 518 and/or 540 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 518 and/or memory 540 may store a localization component 520, perception component 522, maps 524, system controller(s) 526, prediction component 528, and/or planning component 530. As shown in this example, the perception component 522 may include one or more trained ML models, such as object classifier 300 including finetuned object detection ML model 304, output heads 310, and/or OOD detectors 316. Although one object classifier 300 is shown in this example, in other examples the perception component 522 may include any number of deep-learning ML models (e.g., object detectors, object classifiers, segmentation models, object tracking models, etc.). Similar techniques for training deep-learning models and OOD detectors also may be used for various ML models in the prediction component 528, planning component 530, and/or any other vehicle components described herein.

In at least one example, the localization component 520 may include hardware and/or software to receive data from the sensor(s) 506 to determine a position, velocity, and/or orientation of the vehicle 502 (e.g., one or more of an x-, y-, z-position, roll, pitch, or yaw). For example, the localization component 520 may include map(s) of an environment and can continuously determine a location, velocity, and/or orientation of the autonomous vehicle within the map(s). In some instances, the localization component 520 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 520 may provide data to various components of the vehicle 502 to determine an initial position of an autonomous vehicle for generating a trajectory and/or for generating map data, as discussed herein. In some examples, localization component 520 may provide, to the planning component 530 and/or to the prediction component 528, a location and/or orientation of the vehicle 502 relative to the environment and/or sensor data associated therewith.

The memory 518 can further include one or more maps 524 that can be used by the vehicle 502 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In one example, a map can include a three-dimensional mesh generated using the techniques discussed herein. In some instances, the map can be stored in a tiled format, such that individual tiles of the map represent a discrete portion of an environment, and can be loaded into working memory as needed. In at least one example, the one or more maps 524 may include at least one map (e.g., images and/or a mesh) generated in accordance with the techniques discussed herein. In some examples, the vehicle 502 can be controlled based at least in part on the maps 524. That is, the maps 524 can be used in connection with the localization component 520, the perception component 522, and/or the planning component 530 to determine a location of the vehicle 502, identify objects in an environment, and/or generate routes and/or trajectories to navigate within an environment.

In some instances, the perception component 522 may comprise a primary perception system and/or a prediction system implemented in hardware and/or software. The perception component 522 may detect object(s) in in an environment surrounding the vehicle 502 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. To perform these tasks, the perception component 522 may include one or more trained classifier systems (e.g., object classifier 300) including finetuned object detection ML model 304, output heads 310, and/or OOD detectors 316. The object classifier 300 may be configured to perform object detection, classification, segmentation, tracking, and the like. Data determined by the perception component 522 is referred to as perception data.

In some examples, sensor data and/or perception data may be used to generate an environment state that represents a current state of the environment. For example, the environment state may be a data structure that identifies object data (e.g., object position, area of environment occupied by object, object heading, object velocity, historical object data), environment layout data (e.g., a map or sensor-generated layout of the environment), environment condition data (e.g., the location and/or area associated with environmental features, such as standing water or ice, whether it's raining, visibility metric), sensor data (e.g., an image, point cloud), etc. In some examples, the environment state may include a top-down two-dimensional representation of the environment and/or a three-dimensional representation of the environment, either of which may be augmented with object data. In yet another example, the environment state may include sensor data alone. In yet another example, the environment state may include sensor data and perception data together.

The prediction component 528 may include functionality to generate predicted information associated with objects in an environment. As an example, the prediction component 528 can be implemented to predict locations of a pedestrian proximate to a crosswalk region (or otherwise a region or location associated with a pedestrian crossing a road) in an environment as they traverse or prepare to traverse through the crosswalk region. As another example, the techniques discussed herein can be implemented to predict locations of other objects (e.g., vehicles, bicycles, pedestrians, and the like) as the vehicle 502 traverses an environment. In some examples, the prediction component 528 can generate one or more predicted positions, predicted velocities, predicted trajectories, etc., for such target objects based on attributes of the target object and/or other objects proximate the target object.

The planning component 530 may receive a location and/or orientation of the vehicle 502 from the localization component 520, perception data from the perception component 522, and/or predicted trajectories from the prediction component 528, and may determine instructions for controlling operation of the vehicle 502 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 526 and/or drive systems(s) 514 may parse/cause to be carried out, second instructions for the emitter(s) 508 may be formatted according to a second format associated therewith). In at least one example, the planning component 530 may comprise a nominal trajectory generation subcomponent that generates a set of candidate trajectories, and selects a trajectory for implementation by the drive systems(s) 514 based at least in part on determining a cost associated with a trajectory according to U.S. patent application Ser. No. 16/517,506, filed Jul. 19, 2019 and/or U.S. patent application Ser. No. 16/872,284, filed May 11, 2020, the entirety of which are incorporated herein for all purposes.

The memory 518 and/or 540 may additionally or alternatively store a mapping system (e.g., generating a map based at least in part on sensor data), a planning system, a ride management system, etc. Although localization component 520, perception component 522, the prediction component 528, the planning component 530, and/or system controller(s) 526 are illustrated as being stored in memory 518, any of these components may include processor-executable instructions, machine-learned model(s) (e.g., a neural network), and/or hardware and all or part of any of these components may be stored on memory 540 or configured as part of computing device(s) 536.

As described herein, the localization component 520, the perception component 522, the prediction component 528, the planning component 530, and/or other components of the system 500 may comprise one or more ML models. For example, the localization component 520, the perception component 522, the prediction component 528, and/or the planning component 530 may each comprise different ML model pipelines. The prediction component 528 may use a different ML model or a combination of different ML models in different circumstances. For example, the prediction component 528 may use different GNNs, RNNs, CNNs, MLPs and/or other neural networks tailored to outputting predicted agent trajectories in different seasons (e.g., summer or winter), different driving conditions and/or visibility conditions (e.g., times when border lines between road lanes may not be clear or may be covered by snow), and/or based on different crowd or traffic conditions (e.g., more conservative trajectories in a crowded traffic conditions such as downtown areas, etc.). In various examples, any or all of the above ML models may comprise an attention mechanism, GNN, and/or any other neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like.

Memory 518 may additionally or alternatively store one or more system controller(s) 526, which may be configured to control steering, propulsion, braking, safety, emitters, communication, and other systems of the vehicle 502. These system controller(s) 526 may communicate with and/or control corresponding systems of the drive systems(s) 514 and/or other components of the vehicle 502.

In an additional or alternate example, vehicle 502 and/or computing device(s) 536 may communicate (e.g., transmit and/or receive messages over network(s) 534) with one or more passenger devices (not shown). A passenger device may include, for example, a smart phone, portable computer such as a laptop or tablet, wearable device (e.g., smart glasses, smart watch, earpiece), and/or the like. Although a passenger device may be a device associated with a passenger that is discrete from device(s) of the autonomous vehicle, it is contemplated that the passenger device may be a sub-system and/or a device of the vehicle 502. For example, the passenger device may additionally or alternatively comprise a display and/or one or more input/output devices, such as a touchscreen, microphone, speaker, and/or the like. In some examples, the vehicle 502 may transmit messages and/or receive messages from the passenger device.

It should be noted that while FIG. 5 is illustrated as a distributed system, in alternative examples, components of the vehicle 502 may be associated with the computing device(s) 536 and/or components of the computing device(s) 536 may be associated with the vehicle 502. That is, the vehicle 502 may perform one or more of the functions associated with the computing device(s) 536, and vice versa.

EXAMPLE CLAUSES

A. A system comprising: one or more processors; and one or more non-transitory computer-readable media storing computer-executable instructions that, when executed, cause the one or more processors to perform operations comprising: receiving sensor data associated with a vehicle in an environment; providing the sensor data as a first input to a machine learning model comprising a deep neural network configured to determine an object classification based on the first input, wherein the machine learning model is finetuned based on a pretrained model and trained using regularization toward a weight of the pretrained model; determining, based at least in part on an intermediate layer of the deep neural network, a feature vector associated with the sensor data; providing the feature vector as a second input to an out-of-distribution detector, wherein the out-of-distribution detector is configured to determine, based at least in part on a Gaussian mixture model (GMM), an indication of whether the first input is an out-of-distribution input for the machine learning model; and determining an output of the object classifier associated with the sensor data, based at least in part on a first output of the machine learning model and a second output of the out-of-distribution detector; and controlling the vehicle within the environment based at least in part on the output of the object classifier.

B. The system of paragraph A, wherein determining the indication comprises: determining, based at least in part on the Gaussian mixture model (GMM), a likelihood that the feature vector falls within a distribution of feature vectors associated with a plurality of training data used to train the machine learning model.

C. The system of paragraph B, wherein the machine learning model comprises a convolutional neural network configured to output a confidence level associated with the object classification, and wherein determining the output of the object classifier comprises: modifying the confidence level based at least in part on the likelihood that the first input is an out-of-distribution input.

D. The system paragraph A, wherein the pretrained model comprises at least one of: a foundation model; a general-purpose image classification model; or a variational auto-encoder.

E. The system of paragraph A, wherein the machine learning model is finetuned, based on the pretrained model, to perform at least one of: object detection; object segmentation; vehicle classification; road object classification; trajectory prediction; or vehicle lights classification.

F. A method comprising: receiving sensor data associated with a vehicle in an environment; inputting, based at least in part on the sensor data, a first input to a machine learning model, wherein the machine learning model is finetuned based on a pretrained model and trained using regularization toward a weight of the pretrained model; determining, based at least in part on an intermediate layer of the machine learning model, a feature vector associated with the first input; determining, based at least in part on the feature vector, an indication of whether the first input is an out-of-distribution input for the machine learning model; and transmitting, to a downstream component, output data based at least in part on the indication and on an output of the machine learning model.

G. The method of paragraph F, wherein determining the indication comprises: determining, based at least in part on a Gaussian mixture model (GMM), a likelihood that the first input is an out-of-distribution input for the machine learning model.

H. The method of paragraph G, wherein: the Gaussian mixture model (GMM) is configured to model density of a vector space associated with the feature vector; and the likelihood comprises a likelihood that the feature vector falls within a distribution of feature vectors associated with a plurality of training data used to train the machine learning model.

I. The method of paragraph G, wherein the machine learning model comprises a convolutional neural network configured to output: an object classification based at least in part on the sensor data; and a confidence level associated with the object classification, and wherein transmitting the output data comprises: modifying the confidence level based at least in part on the likelihood that the first input is an out-of-distribution input.

J. The method of paragraph G, wherein the machine learning model is configured to output an object classification based at least in part on the sensor data, and wherein the output data comprises: a first output representing the object classification; and an error probability associated with the object classification, based at least in part on the likelihood.

K. The method of paragraph F, wherein: the machine learning model is trained to perform object classification for the vehicle based at least in part on the sensor data; and the machine learning model is trained using L2 starting point regularization based on an initialization weight of the pretrained model.

L. The method of paragraph F, wherein the pretrained model comprises at least one of: a foundation model; a general-purpose image classification model; or a variational autoencoder.

M. The method of paragraph F, wherein the machine learning model is finetuned, based on the pretrained model, to perform at least one of: object detection; object segmentation; vehicle classification; road object classification; trajectory prediction; or vehicle lights classification.

N. One or more non transitory computer readable media storing instructions executable by a processor, wherein the instructions, when executed, cause the processor to perform operations comprising: receiving sensor data associated with a vehicle in an environment; inputting, based at least in part on the sensor data, a first input to a machine learning model; determining, based at least in part on an intermediate layer of the machine learning model, a feature vector associated with the first input; determining, based at least in part on the feature vector and a Gaussian mixture model (GMM) configured to model density of a vector space associated with the feature vector, an indication of whether the first input is an out-of-distribution input for the machine learning model; and transmitting, to a downstream component, output data based at least in part on the indication and on an output of the machine learning model.

O. The one or more non transitory computer readable media of paragraph N, wherein the Gaussian mixture model (GMM) is configured to model density of a vector space associated with the feature vector, and wherein determining the indication comprises: determining, based at least in part on the Gaussian mixture model (GMM), a likelihood that the feature vector falls within a distribution of feature vectors associated with a plurality of training data used to train the machine learning model.

P. The one or more non transitory computer readable media of paragraph O, wherein the machine learning model comprises a convolutional neural network configured to output: an object classification based at least in part on the sensor data; and a confidence level associated with the object classification, and wherein transmitting the output data comprises: modifying the confidence level based at least in part on the likelihood that the first input is an out-of-distribution input.

Q. The one or more non transitory computer readable media of paragraph O, wherein the machine learning model is configured to output an object classification based at least in part on the sensor data, and wherein the output data comprises: a first output representing the object classification; and an error probability associated with the object classification, based at least in part on the likelihood.

R. The one or more non transitory computer readable media of paragraph N, wherein: the machine learning model is finetuned based on a pretrained model; and the machine learning model is trained using L2 starting point regularization based on an initialization weight of the pretrained model.

S. The one or more non transitory computer readable media of paragraph R, wherein the pretrained model comprises at least one of: a foundation model; a general-purpose image classification model; or a variational autoencoder.

T. The one or more non transitory computer readable media of paragraph R, wherein the machine learning model is finetuned, based on the pretrained model, to perform at least one of: object detection; object segmentation; vehicle classification; road object classification; trajectory prediction; or vehicle lights classification.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:

one or more processors; and one or more non-transitory computer-readable media storing computer-executable instructions that, when executed, cause the one or more processors to perform operations comprising:

receiving sensor data associated with a vehicle in an environment;

providing the sensor data as a first input to a machine learning model comprising a deep neural network configured to determine an object classification based on the first input, wherein the machine learning model is finetuned based on a pretrained model and trained using regularization toward a weight of the pretrained model;

determining, based at least in part on an intermediate layer of the deep neural network, a feature vector associated with the sensor data;

providing the feature vector as a second input to an out-of-distribution detector, wherein the out-of-distribution detector is configured to determine, based at least in part on a Gaussian mixture model (GMM), an indication of whether the first input is an out-of-distribution input for the machine learning model; and determining an output of an object classifier associated with the sensor data, based at least in part on a first output of the machine learning model and a second output of the out-of-distribution detector; and controlling the vehicle within the environment based at least in part on the output of the object classifier.

2. The system of claim 1, wherein determining the indication comprises:

determining, based at least in part on the Gaussian mixture model (GMM), a likelihood that the feature vector falls within a distribution of feature vectors associated with a plurality of training data used to train the machine learning model.

3. The system of claim 2, wherein the machine learning model comprises a convolutional neural network configured to output a confidence level associated with the object classification, and wherein determining the output of the object classifier comprises:

modifying the confidence level based at least in part on the likelihood that the first input is an out-of-distribution input.

4. The system of claim 1, wherein the pretrained model comprises at least one of:

a foundation model;

a general-purpose image classification model; or a variational autoencoder.

5. The system of claim 1, wherein the machine learning model is finetuned, based on the pretrained model, to perform at least one of:

object detection;

object segmentation;

vehicle classification;

road object classification;

trajectory prediction; or vehicle lights classification.

6. A method comprising:

receiving sensor data associated with a vehicle in an environment;

inputting, based at least in part on the sensor data, a first input to a machine learning model, wherein the machine learning model is finetuned based on a pretrained model and trained using regularization toward a weight of the pretrained model;

determining, based at least in part on an intermediate layer of the machine learning model, a feature vector associated with the first input;

determining, based at least in part on a Gaussian mixture model (GMM), a likelihood that the first input is an out-of-distribution input for the machine learning model, wherein the GMM is configured to model density of a vector space associated with the feature vector, and wherein the likelihood comprises a likelihood that the feature vector falls within a distribution of feature vectors associated with a plurality of training data used to train the machine learning model; and controlling the vehicle within the environment, based at least in part on the likelihood and on an output of the machine learning model.

7. The method of claim 6, wherein the machine learning model comprises a convolutional neural network configured to output:

an object classification based at least in part on the sensor data; and a confidence level associated with the object classification, and wherein controlling the vehicle comprises:

modifying the confidence level based at least in part on the likelihood that the first input is an out-of-distribution input.

8. The method of claim 6, wherein the machine learning model is configured to output an object classification based at least in part on the sensor data, and wherein the output of the machine learning model comprises:

a first output representing the object classification; and an error probability associated with the object classification, based at least in part on the likelihood.

9. The method of claim 6, wherein:

the machine learning model is trained to perform object classification for the vehicle based at least in part on the sensor data; and the machine learning model is trained using L2 starting point regularization based on an initialization weight of the pretrained model.

10. The method of claim 6, wherein the pretrained model comprises at least one of:

a foundation model;

a general-purpose image classification model; or a variational autoencoder.

11. The method of claim 6, wherein the machine learning model is finetuned, based on the pretrained model, to perform at least one of:

object detection;

object segmentation;

vehicle classification;

road object classification;

trajectory prediction; or vehicle lights classification.

12. One or more non-transitory computer-readable media storing instructions executable by a processor, wherein the instructions, when executed, cause the processor to perform operations comprising:

receiving sensor data associated with a vehicle in an environment;

inputting, based at least in part on the sensor data, a first input to a machine learning model;

determining, based at least in part on an intermediate layer of the machine learning model, a feature vector associated with the first input;

determining, based at least in part on the feature vector and a Gaussian mixture model (GMM) configured to model density of a vector space associated with the feature vector, an indication of whether the first input is an out-of-distribution input for the machine learning model;

controlling the vehicle within the environment, based at least in part on the indication and on an output of the machine learning model.

13. The one or more non-transitory computer-readable media of claim 12, wherein the Gaussian mixture model (GMM) is configured to model density of a vector space associated with the feature vector, and wherein determining the indication comprises:

determining, based at least in part on the Gaussian mixture model (GMM), a likelihood that the feature vector falls within a distribution of feature vectors associated with a plurality of training data used to train the machine learning model.

14. The one or more non-transitory computer-readable media of claim 13, wherein the machine learning model comprises a convolutional neural network configured to output:

an object classification based at least in part on the sensor data; and a confidence level associated with the object classification, and wherein controlling the vehicle comprises:

modifying the confidence level based at least in part on the likelihood that the first input is an out-of-distribution input.

15. The one or more non-transitory computer-readable media of claim 13, wherein the machine learning model is configured to output an object classification based at least in part on the sensor data, and wherein the output of the machine learning model comprises:

a first output representing the object classification; and an error probability associated with the object classification, based at least in part on the likelihood.

16. The one or more non-transitory computer-readable media of claim 12, wherein:

the machine learning model is finetuned based on a pretrained model; and the machine learning model is trained using L2 starting point regularization based on an initialization weight of the pretrained model.

17. The one or more non-transitory computer-readable media of claim 16, wherein the pretrained model comprises at least one of:

a foundation model;

a general-purpose image classification model; or a variational autoencoder.

18. The one or more non-transitory computer-readable media of claim 16, wherein the machine learning model is finetuned, based on the pretrained model, to perform at least one of:

object detection;

object segmentation;

vehicle classification;

road object classification;

trajectory prediction; or vehicle lights classification.

* * * * *